US010141647B2

(12) United States Patent
Rockway et al.

(10) Patent No.: US 10,141,647 B2
(45) Date of Patent: Nov. 27, 2018

(54) SIX DEGREES OF FREEDOM GROUND EXPLOITING VECTOR SENSOR ANTENNA (6GE ANTENNA)

(71) Applicant: SPAWAR Systems Center Pacific, San Diego, CA (US)

(72) Inventors: John W. Rockway, San Diego, CA (US); John H. Meloling, San Diego, CA (US); Michael P. Daly, San Diego, CA (US)

(73) Assignee: The United States of America as represented by Secretary of the Navy, Washington, DC (US)

(*) Notice: Subject to any disclaimer, the term of this patent is extended or adjusted under 35 U.S.C. 154(b) by 163 days.

(21) Appl. No.: 15/263,550

(22) Filed: Sep. 13, 2016

(65) Prior Publication Data

US 2018/0076522 A1 Mar. 15, 2018

(51) Int. Cl.
| | |
|---|---|
| *H01Q 7/00* | (2006.01) |
| *H01Q 1/22* | (2006.01) |
| *H01Q 1/48* | (2006.01) |
| *H01Q 13/00* | (2006.01) |
| *H01Q 3/22* | (2006.01) |
| *G01S 1/00* | (2006.01) |
| *H01Q 1/14* | (2006.01) |
| *H01Q 21/24* | (2006.01) |

(52) U.S. Cl.
CPC ............. *H01Q 7/00* (2013.01); *G01S 1/00* (2013.01); *H01Q 1/14* (2013.01); *H01Q 1/225* (2013.01); *H01Q 1/48* (2013.01); *H01Q 3/22* (2013.01); *H01Q 13/00* (2013.01); *H01Q 21/24* (2013.01)

(58) Field of Classification Search
CPC .......... H01Q 17/00; H01Q 1/48; H01Q 1/225; H01Q 7/00; H01Q 3/22; H01Q 13/00
USPC ........................................ 343/895, 774, 742
See application file for complete search history.

(56) References Cited

U.S. PATENT DOCUMENTS

| | | | | |
|---|---|---|---|---|
| 4,584,582 A | * | 4/1986 | Munger ................ | H01Q 25/04 333/117 |
| 2012/0256702 A1 | * | 10/2012 | Khlat .................... | H03H 7/09 333/133 |
| 2015/0311585 A1 | * | 10/2015 | Church ................. | H01Q 7/005 343/745 |

OTHER PUBLICATIONS

Huang et al; Balancing Magnetic and Electric responses of Vector—Sensing Antenna; Antennas and Propagation Society International Symposium, IEEE, 2001.

(Continued)

*Primary Examiner* — Jessica Han
*Assistant Examiner* — Hai V Tran
(74) *Attorney, Agent, or Firm* — SPAWAR Systems Center Pacific; Kyle Eppele; J. Eric Anderson

(57) ABSTRACT

An antenna comprising: a ground plane having a center; six receive ports mounted to the ground plane in a circular configuration around the center and separated from each other by approximately 60 degrees; three conductive half-loops, disposed in mutually orthogonal planes, wherein each half-loop has two ends that are connected to separate receive ports; and three 180° hybrids, each 180° hybrid having two input ports, a delta output port, and a sum output port, wherein the two input ports of each 180° hybrid are connected to the two receive ports of one of the half-loops.

20 Claims, 8 Drawing Sheets

(56) References Cited

OTHER PUBLICATIONS

King, "The Rectangular Loop Antenna as a Dipole," IRE Transactions on Antennas and Propagation, vol. AP-7, pp. 53-61, Jan. 1959.
Whiteside et al., "The Loop Antenna as a Probe," IEEE Transactions on Antennas and Propagation, vol. 12, pp. 291-297, May 1964.

\* cited by examiner

*Vertical Polarization*
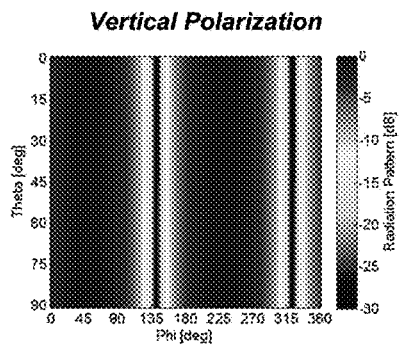
Full-Loop
Antenna
*Horizontal Polarization*
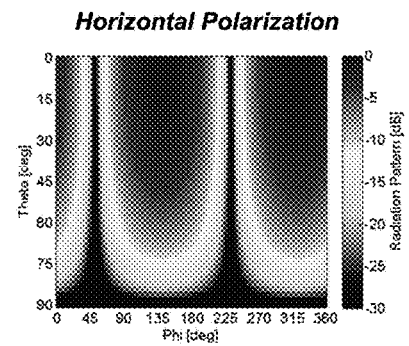
Fig. 5A
Fig. 5B
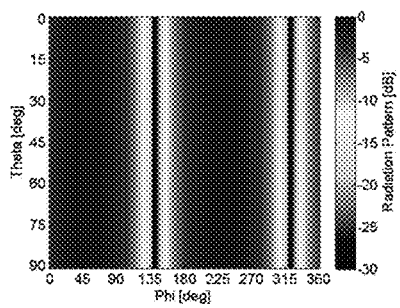
6Ge Antenna
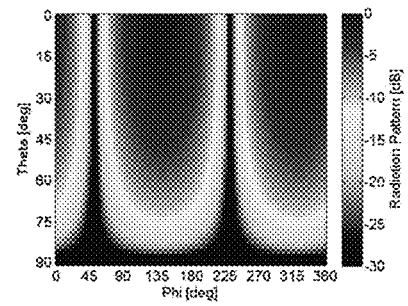
Fig. 5C
Fig. 5D

US 10,141,647 B2

SIX DEGREES OF FREEDOM GROUND EXPLOITING VECTOR SENSOR ANTENNA (6GE ANTENNA)

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102566.

BACKGROUND OF THE INVENTION

The antenna disclosed herein relates to the field of High Frequency (HF) communications and direction-finding system applications. Previous systems for direction-finding and HF communications have attempted to meet the following requirements with varying degrees of success: simultaneous dipole and loop mode performance, low noise, electrically small and wideband operation from 3 to 30 MHz. Some prior art systems use many antenna structures operating in different modes, and in many implementations, covering different parts of the 3 to 30 MHz spectrum to meet these requirements. Problems encountered by prior art systems include, among other things, installation difficulty, balun design difficulty, and poor antenna performance.

SUMMARY

Disclosed herein is an antenna that comprises a ground plane, six receive ports, three conductive half-loops, and three 180° hybrids. The six receive ports are mounted to the ground plane in a circular configuration around the center of the ground plane and separated from each other by approximately 60 degrees. The three conductive half-loops are disposed in mutually orthogonal planes. Each half-loop has two ends that are connected to separate receive ports. The three 180° hybrids each have two input ports, a delta output port, and a sum output port. The two input ports of each 180° hybrid are connected to the two receive ports of one of the half-loops.

Another embodiment of the antenna is also described herein as comprising a ground plane, six receive ports, three conductive, ground symmetric half-loops, six transformers, three 180° hybrids, six low noise amplifiers (LNAs), and six receivers. The six receive ports are mounted to the ground plane in a circular configuration about the center of the ground plane and they are separated from each other by approximately 60 degrees. The three half-loops are disposed in mutually orthogonal planes in which each loop is approximately positioned at a 54° angle from the ground plane. Each half-loop has two ends, and each end is connected to a separate receive port. One of the six transformers is connected to every receive port. Every half-loop is associated with one of the 180° hybrids. Each 180° hybrid has two input ports, a delta output port, and a sum output port. The two input ports of each 180° hybrid are connected to the two transformers that are connected to the two receive ports of one of the half-loops. The transformers are configured to transform the impedance of the receive ports to match the impedance of the 180° hybrids to which they are connected. Each delta output port and sum output port is connected to a different LNA, and each LNA is configured to produce an amplified signal. Each receiver is configured to receive the amplified signal from one of the LNAs.

BRIEF DESCRIPTION OF THE DRAWINGS

Throughout the several views, like elements are referenced using like references. The elements in the figures are not drawn to scale and some dimensions are exaggerated for clarity.

FIGS. 5A-5D are plots of polarization responses of a full-loop antenna and of an embodiment of a six degrees of freedom ground exploiting vector sensor antenna in loop mode.

DETAILED DESCRIPTION OF EMBODIMENTS

The antenna disclosed below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
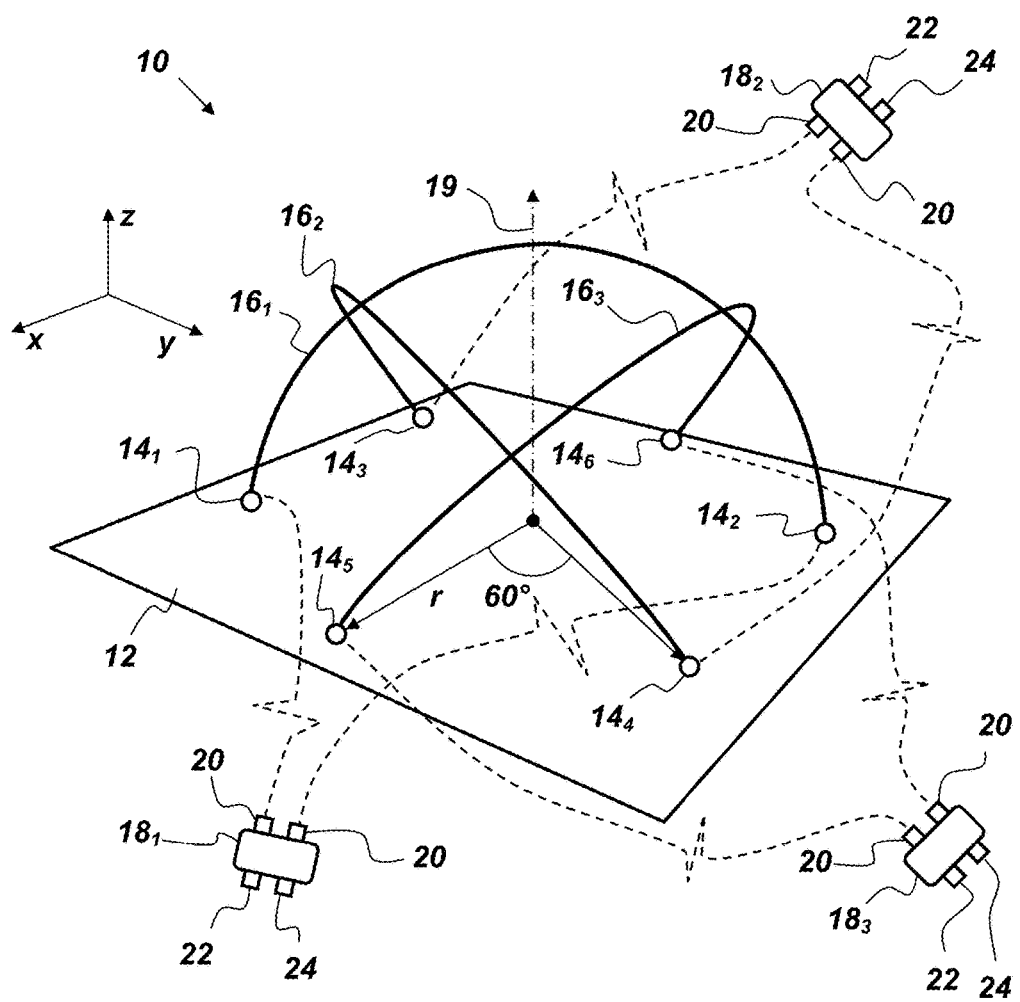
FIG. 1 is a perspective view of an embodiment of a six degrees of freedom ground exploiting vector sensor antenna.

FIG. 1 is an illustration of an embodiment of a six degrees of freedom ground exploiting vector sensor antenna (referred to hereafter as the 6Ge Antenna) 10 that comprises, consists of, or consists essentially of a ground plane 12, six receive ports 14, three conductive half-loops 16, and three 180° hybrids 18. The six receive ports 14 are mounted to the ground plane 12 in a circular configuration around a vertical axis 19 and separated from each other by approximately 60 degrees in azimuth. The three conductive half-loops $16_1$-$16_3$ are disposed in mutually orthogonal planes. Each half-loop 16 has two ends that are connected to separate receive ports 14. The three 180° hybrids 18 each have two input ports 20, a delta output port 22, and a sum output port 24. The two input ports 20 of each 180° hybrid 18 are connected to the two receive ports 14 of one of the half-loops 16. For example, the two ends of half-loop $16_1$ are shown in FIG. 1 as being connected to receive ports $14_1$ and $14_2$, which are connected to the input ports 20 of the 180° hybrid $18_1$.

The 6Ge antenna 10 is a vector-sensing antenna that may be used as a compact substitute for a conventional antenna array used for direction-finding. Instead of relying on physically-separated elements that require large physical separations for long wavelengths, the 6Ge antenna 10 uses elements with diverse radiation patterns so an incident signal from a given direction of arrival has a unique spatial signature. Each half-loop 16 of the 6Ge antenna 10 has two ports from which both an approximate dipole and a loop radiation pattern can be formed. The six radiation patterns are approximately orthogonal. In an example embodiment, at 2 MHz the 6Ge antenna 10 is about 1/150 of a wavelength in diameter and about 1/300 of a wavelength in height.

The radius r of each half-loop is a design variable that may be adjusted depending on the desired performance range. For example, the radius r of each half-loop may be 0.5 meters for suitable wideband (i.e., 3 to 30 MHz) performance. The shape of each half-loop is also a design variable. Each half-loop may be a half-circle, a half-octagon, rectangular, etc. The half-loops 16 may be made of any conductive material and may be solid or hollow. For example, in one embodiment, the half-loops 16 may each be fabricated as a half-octagon using copper tubing having a diameter of approximately 1.5 cm (0.6 inches). The three half-loops 16 of the 6Ge antenna 10 are oriented evenly about the vertical center of the antenna. Each half-loop 16 is offset at least one half-loop-cross-sectional width from the other half-loops 16 such that none of the half-loops 16 are physically touching. There is a receive port 14 where ever either end of a half-loop 16 connects to the ground 12. Thus there are two receive ports 14 for each half-loop 16.

The ground plane 12 may be any conductive planar surface. The ground plane 12 should be disposed directly beneath the half-loops 16 and be large enough to encompass the entire footprint of the half-loops 16. The ground plane 12 may have any desired shape and thickness. Ideally, the ground plane 12 should be larger than the footprint of the half-loops 16. If the size of the ground plane 12 approximates, or is less than, the footprint of the half-loops 16 it could potentially distort the radiation patterns or input impedance of the 6Ge antenna 10, but the pattern distortion can be compensated for and the effect on the input impedance is not enough to seriously degrade performance.

Figure 2A:
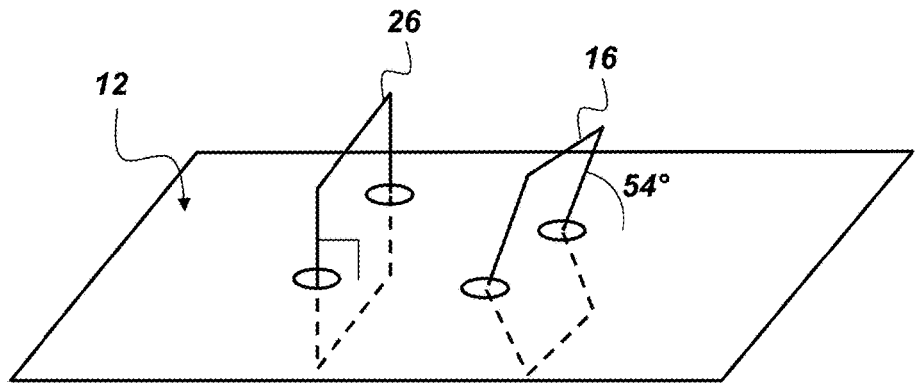
FIGS. 2A and 2B are perspective views of half-loops mounted to a ground plane.
Figure 2B:
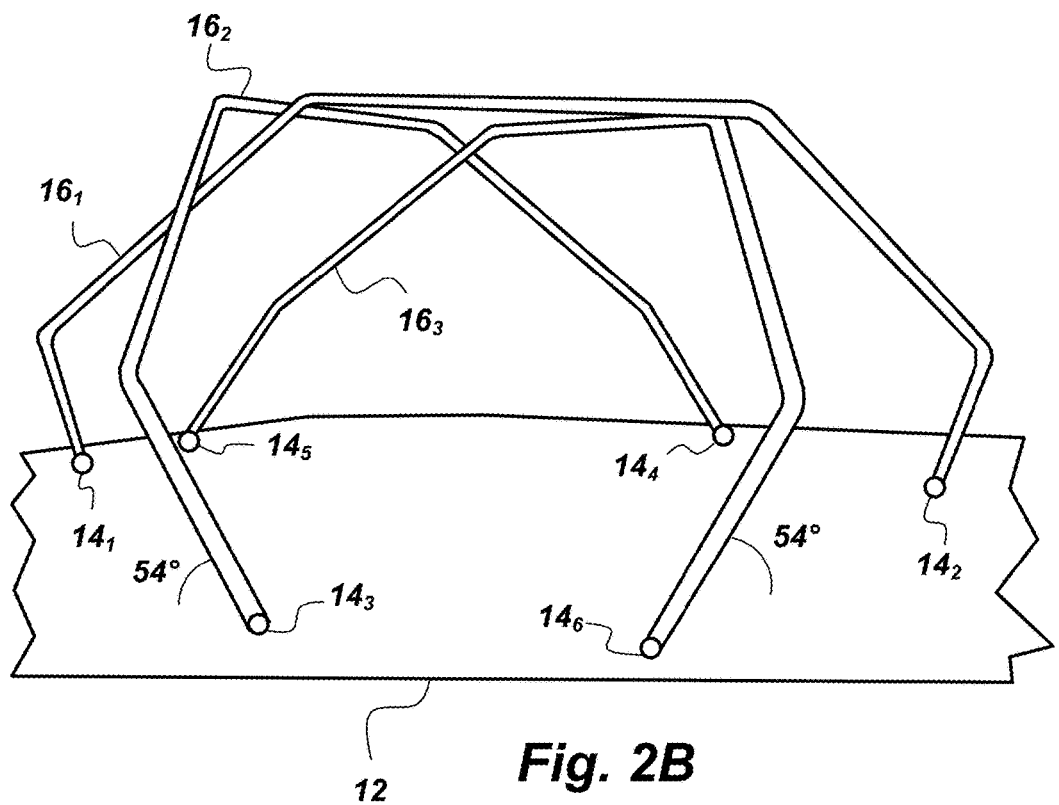

FIGS. 2A and 2B are perspective views half-loops mounted to the ground plane 12 at different orientations. FIG. 2A shows a half-loop 26 that is mounted to the ground plane 12 at a right angle. FIG. 2A also shows a half-loop 16 (such as is used in the 6Ge antenna 10) that is mounted to the ground plane 12 at an angle of approximately 54 degrees with respect to the ground plane 12. The half-loops 16 of the 6Ge antenna 10, while they are orthogonally disposed with respect to each other, are mounted to the ground plane 12 at an approximate angle of 54 degrees, as is shown by the example half-loop 16 shown in FIG. 2A and the half-loops $16_1$-$16_3$ shown in FIG. 2B. The 6Ge antenna 10 leverages the ground 12 as the virtual other half of the antenna as represented by the dotted lines in FIG. 2A. In the embodiment of 6Ge antenna 10 shown in FIG. 2B, the half-loops $16_1$-$16_3$ are in the shape of half-octagons.

The 6Ge Antenna 10 is capable of generating a virtual image. A single tilted half-loop and its image, such as the half-loop 16 shown in FIG. 2A do not form a circular loop. Therefore, its radiation patterns will not be able to form loop or dipole modes. However, in the 6Ge antenna 10, there are two other half-loops 16, such as is depicted in FIG. 2B. These two other half loops 16 may be used to create a virtual image that results in the proper loop and dipole modes. The virtual image is due to the reflection off of the ground plane 12. It's the mirror image, just as in optics, that's created by placing this half-loop 16 very close to a reflecting surface (i.e., the ground plane 12). When the half-loop is fully upright (e.g., half-loop 26), the mirror image is also fully up and down, creating a full loop. But if you tilt the half-loop to one side, the mirror image bends to the same size so the loop plus its image is no longer in a 2-dimensional plane.

The six receive voltages from the 6Ge antenna 10 may be linearly combined to transform them into the equivalent voltages that would have been received from three full loops and three dipoles of a traditional six-antenna vector sensor mounted above ground.

Figure 3:
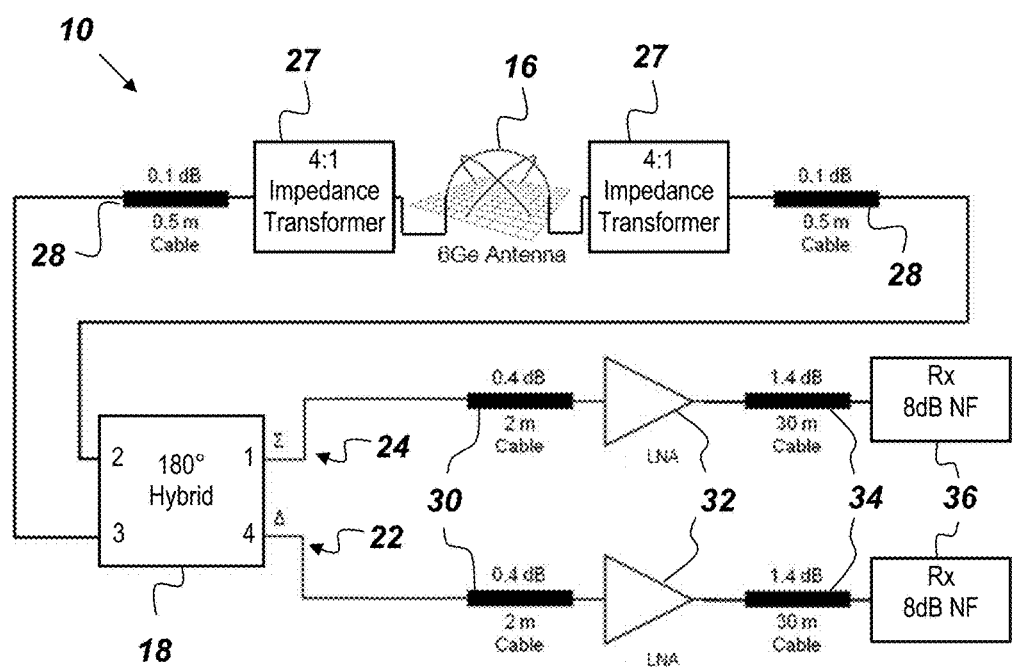
FIG. 3 is a block diagram of an embodiment of a six degrees of freedom ground exploiting vector sensor antenna.

FIG. 3 is a detailed block diagram of an example embodiment of the 6Ge antenna 10. In this embodiment, each end of a given half-loop 16 is connected to a 4:1 transformer, which in turn is connected to a transmission line 28 of approximately 0.5 meters length. The transmission loss for the transmission line may be expected to be approximately 0.1 dB. Both transmission lines 28 are connected into single 180-degree hybrid 18. The output of the SUM ($S_E$) port 24 is the sum of the two input signals. The output of the DELTA ($I_N$) port 22 is the difference of the two input signals. In this embodiment of the 6Ge antenna 10, both the SUM and DELTA outputs are followed by a coaxial cable 30 of 2 meter length and a low noise amplifier (LNA) 32. Suitable examples of the LNA 32s include, but are not limited to, the Shireen LNA-643 with a Noise Figure (NF) of 2.5 dB, and an IP3 of 35 dBm and a gain of 41 dB. Then, in this embodiment, both LNA 32s are then followed by 30 meter cables 34 with approximately 1.4 dB of loss. The SUM signal and the DELTA signal are then inputs to receivers 36 where 8 dB NF may be assumed. The receivers 36 may be any radio receiver that operates at HF. A suitable, non-limiting, example of the receiver 16 is a RFSPACE SDR-IP software-defined radio. At a bare minimum, the receiver 36 would need to have a mixer, a low pass filter to down-convert a signal to baseband, and an analog to digital converter. The specific values described above and shown in FIG. 3 were selected to meet several performance metrics of an HF receive antenna. These performance metrics include dual-mode (i.e., both dipole and loop), wideband (i.e., 3 to 30 MHz), low noise, and electrically small (i.e., electrically smaller than the highest operating frequency of 30 MHz). Other specific values may be used for other desired performance and/or antenna size.

The transformer shown in FIG. 3 is used to match the receive ports 14 to the input impedance of the RF chain, which in this embodiment is 50Ω. While the impedance mismatch has only a minor effect on the system noise figure as will be discussed later, the transformer serves to equalize the dipole and loop mode response from each element. The ratio of the incident electric field voltage response to the incident magnetic field voltage response for a two-port loop may be calculated according to methods that are known by those having ordinary skill in the art. This ratio is a function of the loop diameter, the radius of the wire that forms the loop, and the loading impedances at both ports of the loop. Setting the ratio of the incident electric field voltage response to the incident magnetic field voltage response to unity gives a loading impedance of 394Ω that, for an electrically small loop, is approximately constant over frequency. Because the elements of the 6Ge antenna 10 are half-loops, the ideal loading impedance is half that of a full loop or around 200Ω. Thus, a 4:1 transformer was fabricated for each of the six receive ports 14. This was implemented, in this embodiment, using a Guanella balun (actually an "un-un" as both sides are unbalanced), for which a 4:1 ratio is a common type.

The isolation between receive ports 14 belonging to different half-loops 16 should be high so that radiation patterns can be orthogonal. For example, in the embodiment of the 6Ge antenna 10 shown in FIG. 2B, the isolation is greater than 20 dB between two ports of different half-loops that are physically close to each other (e.g., receive ports $14_1$ and $14_3$) and the isolation is even greater between two ports of different half-loops that are as far apart as possible (e.g., receive ports $14_1$ and $14_6$).

Figure 4A:
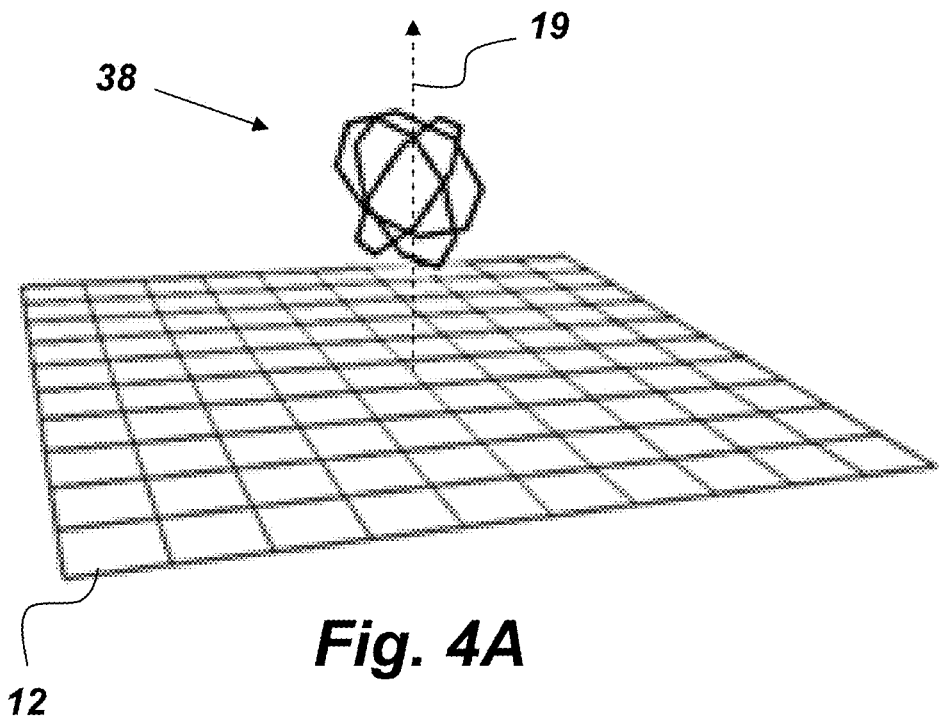
FIG. 4A is a perspective view of an embodiment of a full-loop antenna.

FIG. 4A is a perspective illustration of a full-loop antenna 38 comprising three full, octagonal loops that are orthogonal to each other and are disposed above the ground plane 12. The 6Ge antenna 10 provides substantially the same dual-mode performance as the full-loop antenna 38. The three full loops of the full-loop antenna 38 are evenly spaced in azimuth around the vertical axis 19. The only difference in the responses between the full-loop antenna 38 and the 6Ge antenna 10 is that the response will be rotated along the phi axis, or in other words, rotated in azimuth (xy plane). (See FIG. 4B)

Figure 4B:
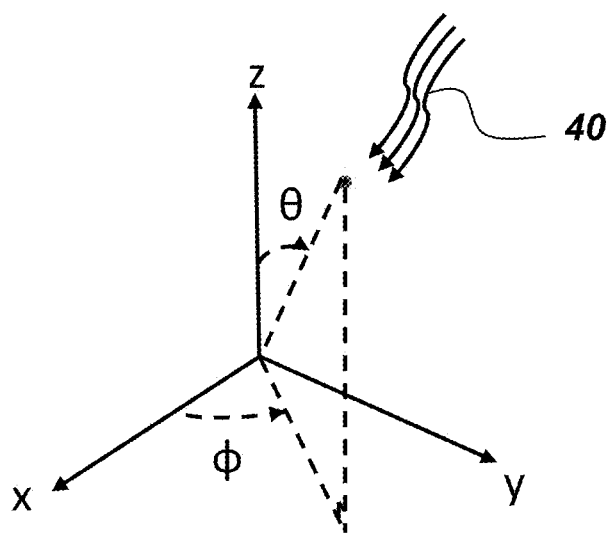
FIG. 4B is an illustration of a coordinate plane.

FIG. 4B shows a received signal 40 and a three-dimensional coordinate plane. The angle phi Φ is shown in FIG. 4B. If the half-loops 16 weren't rotated relative to one another, then the 6Ge antenna 10 would be the same as the full-loop antenna 38 in FIG. 4A, except that the ground plane 12 goes up halfway on the antenna in FIG. 1 while the loops in FIG. 4A float above the ground plane 12. Otherwise, the loops can be the same shape, size and/or orientation. In all loops and half-loops, the loop mode and dipole mode responses are substantially the same for the full-loop antenna 38 and the 6Ge antenna 10. The receive directivities of one of the loops from the full-loop antenna 38 and from one of the half-loops 16 of the 6Ge antenna 10 are substantially the same. The radiation patterns of the 6Ge antenna 10 are not expected to be exactly like those formed by the full-loop antenna 38 in free space. A half-loop upright on a ground plane, such as half-loop 26 shown in FIG. 2A, should have the same far-field radiation above the ground plane 12 as a full loop in free space, but when the half-loop is tilted, the actual loop and its image are no longer in the same plane. Hence, the radiation pattern is not the same as a full loop in free space. Despite this, the loop mode radiation patterns measured for the 6Ge antenna 10 and the full-loop antenna 38 were very similar.

FIGS. 5A-5D are plots of polarization responses of the full-loop antenna 38 and the 6Ge antenna 10. FIG. 5A is a plot of the vertical polarization response of the full-loop antenna 38. FIG. 5B is a plot of the horizontal polarization response of the full-loop antenna 38. FIG. 5C is a plot of the vertical polarization response of the 6Ge antenna 10. FIG. 5D is a plot of the horizontal polarization response of the 6Ge antenna 10. Theta θ is the zenith angle of the receive signal 40. Phi Φ is the azimuthal angle measured from the x-axis of the receive signal 40. The radiation pattern in FIGS. 5A-5D is the receive directivity of the loop mode. The receive frequency is 3 MHz.

Figure 6A:
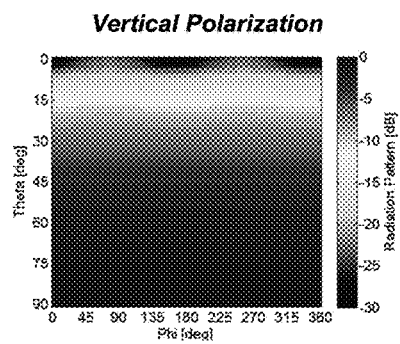
FIGS. 6A-6D are plots of polarization responses of a full-loop antenna and of an embodiment of a six degrees of freedom ground exploiting vector sensor antenna in dipole mode.
Figure 6B:
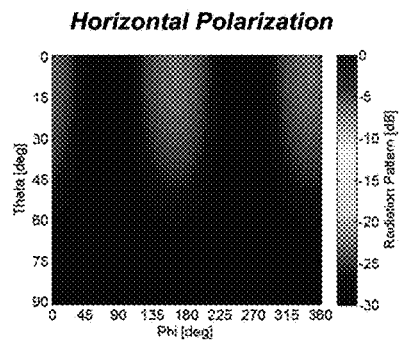
Figure 6C:
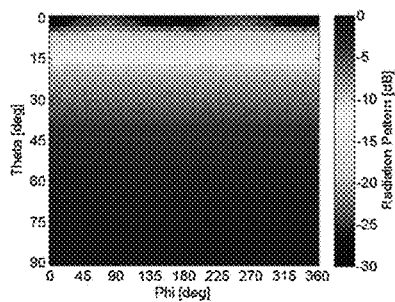
Figure 6D:
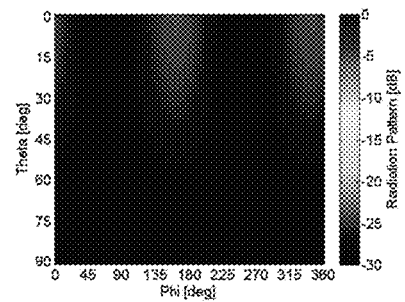

FIGS. 6A-6D are plots of polarization responses of the full-loop antenna 38 and the 6Ge antenna 10 in dipole mode at 3 MHz. FIG. 6A is a plot of the vertical polarization response of the full-loop antenna 38. FIG. 6B is a plot of the horizontal polarization response of the full-loop antenna 38. FIG. 6C is a plot of the vertical polarization response of the 6Ge antenna 10. FIG. 6D is a plot of the horizontal polarization response of the 6Ge antenna 10. Even though the 6Ge antenna 10 is half the size of the full-loop antenna 38, in all cases, the loop mode and dipole mode responses are the same for the full-loop antenna 38 and the 6Ge antenna 10. The 6Ge antenna 10 is capable of simultaneously supporting the reception of both the dipole and loop modes.

Figure 7:
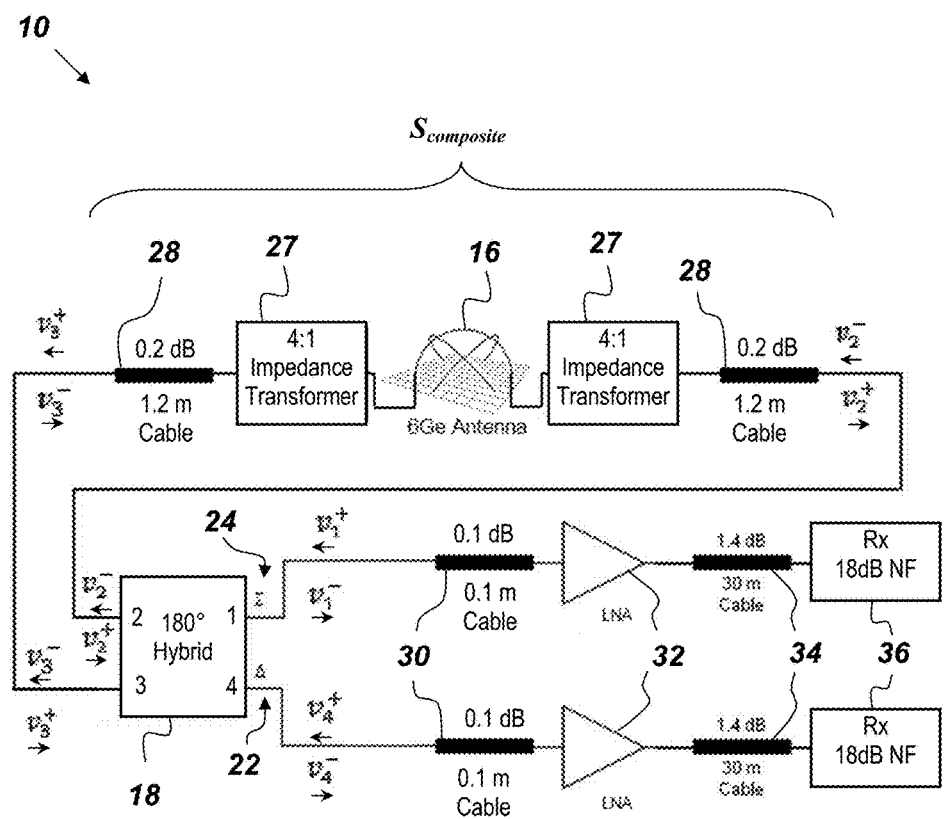
FIG. 7 is a block diagram of an embodiment of a six degrees of freedom ground exploiting vector sensor antenna.

FIG. 7 is a block diagram of another example embodiment of the 6Ge antenna 10. This embodiment differs from the one depicted in FIG. 3 in that it has different cable lengths and component values. The 6Ge antenna 10 may be designed to keep its system noise below that of external high frequency (HF) noise. Because the 6Ge antenna 10 is primarily designed to receive signals it can tolerate inefficient, mismatched antennas if the internal system noise is much lower than external environmental noise, because the small antenna will reject the desired signal and in-band external noise equally. Sources of HF external noise are galactic noise, atmospheric noise, and man-made noise. Galactic noise from space is usually much lower power than atmospheric noise, which is primarily from lightning strikes. Major sources of man-made noise are engines and power distribution equipment, and noise power varies by location. The International Telecommunication Union categorizes locations by their expected noise level into Quiet Rural, Rural, Urban, and Industrial. The embodiment of the 6Ge antenna 10 shown in FIG. 6 is designed to have a system noise level less than the expected noise level of a Quiet Rural environment, over the HF band.

The system noise level may be computed assuming a somewhat simplified radio frequency (RF) receive chain such as represented by the block diagram shown in FIG. 6. The computation neglects bias tees and transient protection devices because these components should not introduce significant loss or mismatch at HF and thus contribute little to the system noise level. The components that will set the system noise level are the half-loops 16 themselves, the impedance transformer 27, the hybrid coupler 18, the LNAs 32, the receivers 36, and the cables 28, 30, and 34. The noise figure NF is given by:

$$NF_i = 10\log_{10}\left(1 + \frac{T_i}{T_0}\right) dB \quad (1)$$

where i=Σ or Δ corresponding to the noise figure of the dipole or loop mode, respectively. The mismatch factor through the 180° hybrid coupler 18 is different for the dipole and loop modes, as will be shown next, so the system noise figure is slightly different. $T_0$ is the standard noise temperature, 290° K. The system noise temperature, $T_i$, is given by $$T_i = T_0 \left( \frac{1-\eta_r}{\eta_r} + \frac{1-G_{cable1}}{\eta_r \tau_{feedpoint} G_{cable1}} + \right.$$

$$\frac{1-G_{hybrid}}{\eta_r \tau_{feedpoint} G_{cable1} G_{hybrid}} + \frac{1-G_{cable2}}{\eta_r \tau_{feedpoint} G_{cable1} G_{hybrid} \tau_i G_{cable2}} +$$

$$\frac{f_{LNA}-1}{\eta_r \tau_{feedpoint} G_{cable1} G_{hybrid} \tau_i G_{cable2}} +$$

$$\frac{1-G_{cable3}}{\eta_r \tau_{feedpoint} G_{cable1} G_{hybrid} \tau_i G_{cable2} G_{LNA} G_{cable3}} +$$

$$\left. \frac{f_{RX}-1}{\eta_r \tau_{feedpoint} G_{cable1} G_{hybrid} \tau_i G_{cable2} G_{LNA} G_{cable3}} \right) \quad (2)$$

where the following variables are defined going from the half-loops 16 to the receiver 36:

$\eta_r$ is the antenna radiation efficiency;

$\tau_{feedpoint}$ is the mismatch loss at the antenna receive ports 14 after the transformers 27;

$G_{cable1}$ is the gain (less than unity) of the cable connecting the transformer 27 to the 180° hybrid coupler 18;

$G_{hybrid}$ is the gain (less than unity) through the 180° hybrid coupler 18;

$\tau_i$ is the hybrid port i mismatch loss;

$G_{cable2}$ is the gain (less than unity) of the cable connecting the 180° hybrid coupler 18 to the LNA 32;
$f_{LNA}$ is the noise factor of the LNA 32;
$G_{LNA}$ is the gain of the LNA 32;
$G_{cable3}$ is gain of the cable connecting the LNA 32 to the receiver 36; and
$F_{RX}$ is the noise factor of the receiver 36.

The antenna radiation efficiency may be supplied by computer simulations, and the mismatch may be from the measured S-parameters. An example of a suitable program for providing computer simulations is MININEC Pro Antenna Analysis Software. The attenuation from cables 28, 30, and 34, the gain of the LNA 32, and the noise factor of the LNA and receiver 36 can be obtained from manufacturer specifications. The incoming voltage waves (v⁺) into the 180° hybrid coupler 18 and outgoing voltage waves (v⁻) are related to the S-parameters by:

$$\begin{bmatrix} v_1^- \\ v_2^- \\ v_3^- \\ v_4^- \end{bmatrix} = S_{hybrid} \begin{bmatrix} v_1^+ \\ v_2^+ \\ v_3^+ \\ v_4^+ \end{bmatrix} \quad (3)$$

The 180° hybrid coupler 18 may be assumed to be ideal since at HF its loss is negligible. The S-parameters of the 180° hybrid coupler 18 are given by:

$$S_{hybrid} = \frac{-j}{\sqrt{2}} \begin{bmatrix} 0 & 1 & 1 & 0 \\ 1 & 0 & 0 & -1 \\ 1 & 0 & 0 & 1 \\ 0 & -1 & 1 & 0 \end{bmatrix} \quad (4)$$

Equation 4 may be used to determine the hybrid coupler sum and difference ports mismatch losses in the following manner. Let the S-parameter matrix $S_{composite}$ consist of the two-port shown in FIG. 7 including everything from a half-loop element 16 up to the two coaxial cables 28 that connect to the 180° hybrid coupler 18. The same voltage waves defined for the 180° hybrid coupler 18 in equation 3 are now related to this $S_{composite}$ two-port by:

$$\begin{bmatrix} v_2^+ \\ v_3^+ \end{bmatrix} = S_{composite} \begin{bmatrix} v_2^- \\ v_3^- \end{bmatrix} = \begin{bmatrix} s_{11} & s_{12} \\ s_{21} & s_{22} \end{bmatrix} \begin{bmatrix} v_2^- \\ v_3^- \end{bmatrix} \quad (5)$$

The reflection coefficients looking into the sum and difference ports (22 and 24 respectively) of the 180° hybrid coupler 18 are given by the following two equations:

$$\Gamma_{in,\Sigma} = \frac{v_1^-}{v_1^+}\bigg|_{v_4^+ = 0} \quad (6)$$

$$\Gamma_{in,\Delta} = \frac{v_4^-}{v_4^+}\bigg|_{v_1^+ = 0} \quad (7)$$

These may be written in terms of the S-parameters of the composite two-port connected to the 180° hybrid coupler 18:

$$\Gamma_{in,\Sigma} = -\frac{1}{2}(s_{11} + s_{12} + s_{21} + s_{22}) \quad (8)$$

$$\Gamma_{in,\Delta} = \frac{1}{2}(-s_{11} + s_{12} + s_{21} - s_{22}) \quad (9)$$

The mismatch factors at the sum and difference ports (22 and 24 respectively) of the 180° hybrid coupler 18 may be computed by:

$$\tau_\Sigma = 1 - |\Gamma_{in,\Sigma}|^2 \quad (10)$$

$$\tau_\Delta = 1 - |\Gamma_{in,\Delta}|^2 \quad (11)$$

All of these inputs may be used to calculate the system noise temperature in Equation 2 which may be used in Equation 1 to calculate the system noise figure.

Figure 8:
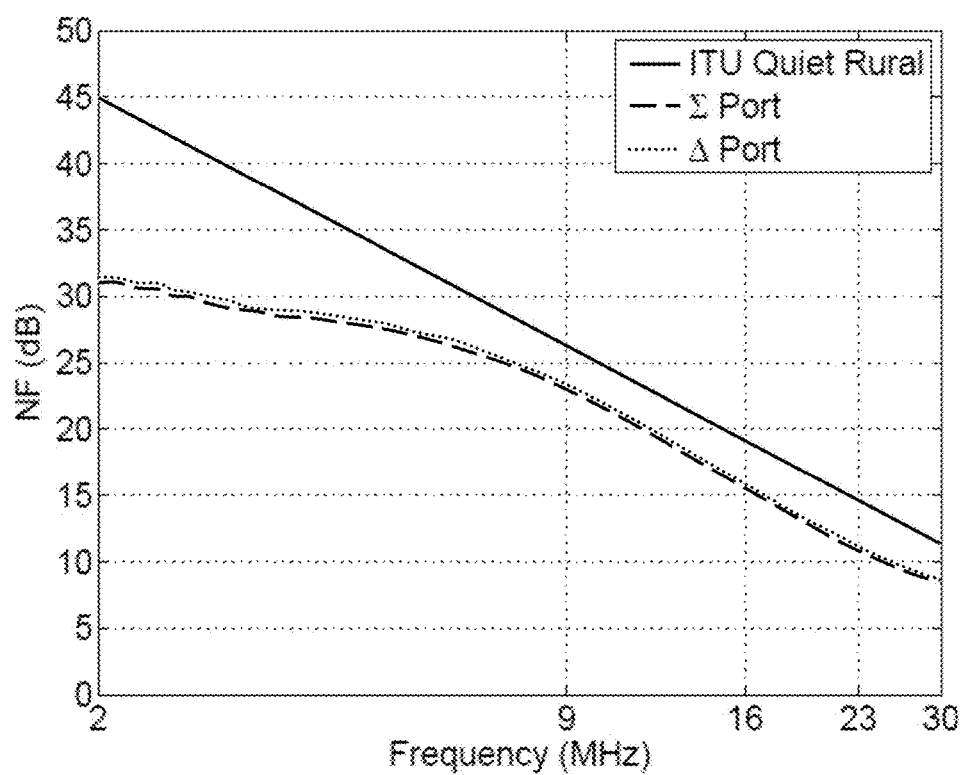
FIG. 8 is a plot of calculated system noise figures.

FIG. 8 is a plot of calculated system noise figures of sum (dipole mode) and difference (loop mode) compared to the Quiet Rural HF noise model. The graph in FIG. 8 shows that the expected noise in a Quiet Rural environment is higher than the system noise figure for both the loop and dipole synthesized antenna patterns.

From the above description of the 6Ge antenna 10, it is manifest that various techniques may be used for implementing the concepts of the antenna without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the 6Ge antenna 10 is not limited to the particular embodiments described herein, but is capable of many embodiments without departing from the scope of the claims.

We claim:

1. An antenna comprising:
 a ground plane having a center;
 six receive ports mounted to the ground plane in a circular configuration around the center and separated from each other by approximately 60 degrees;
 three conductive half-loops, each respectively disposed in one of three mutually orthogonal planes, wherein each half-loop has two ends and wherein each end is respectively connected to one of the six receive ports; and
 three 180° hybrids, each 180° hybrid having two input ports, a delta output port, and a sum output port, wherein the two input ports of each 180° hybrid are respectively connected to the two receive ports of one of the half-loops.

2. The antenna of claim 1, further comprising six 4:1 impedance transformers, one of which connected between each receive port and corresponding input port.

3. The antenna of claim 2, wherein each of the 4:1 impedance transformers is an unbalanced-unbalanced transformer.

4. The antenna of claim 1, wherein each half-loop is a half-octagon.

5. The antenna of claim 4, wherein each half-loop has a 0.5 meter radius.

6. The antenna of claim 5, wherein each half-loop is made of copper tubing having a 1.254 cm diameter.

7. The antenna of claim 1, wherein each half-loop is a half-circle.

8. The antenna of claim 1, wherein the half-loops are positioned such that they do not touch each other.

9. The antenna of claim 1 wherein each of the three mutually orthogonal planes is approximately positioned at a 54° angle from the ground plane.

10. An antenna comprising:
a ground plane having a center;
six receive ports mounted to the ground plane in a circular configuration around the center and separated from each other by approximately 60 degrees;
three conductive half-loops, each respectively disposed in one of three mutually orthogonal planes, wherein each half-loop has two ends and wherein each end is respectively connected to one of the six receive ports;
three 180° hybrids, each 180° hybrid having two input ports, a delta output port, and a sum output port, wherein the two input ports of each 180° hybrid are respectively connected to the two receive ports of one of the half-loops;
six 4:1 impedance transformers, one of which connected between each receive port and corresponding input port; and
six low noise amplifiers (LNAs), each LNA being connected to a respective delta output port or sum output port such that every delta output port and every sum output port is connected to a corresponding LNA, and wherein an output of each LNA is provided to a separate receiver.

11. The antenna of claim 10, wherein each 4:1 impedance transformer is connected to its corresponding input port via a 0.5 meter cable, each sum output port is connected to its corresponding LNA via a 2 meter cable, each delta output port is connected to its corresponding LNA via a 2 meter cable, and the output of each LNA is provided to its corresponding receiver via a 30 meter cable.

12. An antenna comprising:
a ground plane having a center;
six receive ports mounted to the ground plane in a circular configuration about the center and separated from each other by approximately 60 degrees, each receive port having an impedance;
three conductive, ground symmetric half-loops, disposed in mutually orthogonal planes in which each half-loop is approximately positioned at a 54° angle from the ground plane, wherein each half-loop has two ends, and each end is connected to a separate receive port;
six transformers, one connected to every receive port;
three 180° hybrids, one for every half-loop, each 180° hybrid having an impedance, two input ports, a delta output port, and a sum output port, wherein the two input ports of each 180° hybrid are connected to the two transformers that are connected to the two receive ports of one of the half-loops, and wherein each transformer is configured to transform the impedance of the receive port to match the impedance of the 180° hybrid to which each transformer is connected;
six low noise amplifiers (LNAs), wherein each delta output port and sum output port is connected to a different LNA, wherein each LNA is configured to produce an amplified signal; and
six receivers, wherein each receiver is configured to receive the amplified signal from one of the six LNAs.

13. The antenna of claim 12, wherein the transformers are 4:1 impedance transformers.

14. The antenna of claim 13, wherein each of the 4:1 impedance transformers is an unbalanced-unbalanced transformer.

15. The antenna of claim 14, wherein each 4:1 impedance transformer is connected to its corresponding input port via a 0.5 meter cable, each sum output port is connected to its corresponding LNA via a 2 meter cable, each delta output port is connected to its corresponding LNA via a 2 meter cable, and the amplified signal of each LNA is provided to its corresponding receiver via a 30 meter cable.

16. The antenna of claim 12, wherein each half-loop is a half-octagon.

17. The antenna of claim 12, wherein each half-loop is a half-circle.

18. The antenna of claim 17, wherein each half-loop has a 0.5 meter radius.

19. The antenna of claim 18, wherein each half-loop is made of copper tubing having a 1.254 cm diameter.

20. The antenna of claim 12, wherein the half-loops are positioned such that they do not touch each other.

* * * * *